(12) United States Patent
Yagi et al.

(10) Patent No.: US 11,926,562 B2
(45) Date of Patent: Mar. 12, 2024

(54) CRYSTALLIZED GLASS SUBSTRATE

(71) Applicant: OHARA INC., Kanagawa (JP)

(72) Inventors: Toshitaka Yagi, Kanagawa (JP); Kohei Ogasawara, Kanagawa (JP); Yuki Motoshima, Kanagawa (JP); Reika Kojima, Kanagawa (JP); Yutaka Yamashita, Kanagawa (JP); Naoyuki Goto, Kanagawa (JP)

(73) Assignee: OHARA INC., Kanagawa (JP)

(*) Notice: Subject to any disclaimer, the term of this patent is extended or adjusted under 35 U.S.C. 154(b) by 502 days.

(21) Appl. No.: 17/266,997

(22) PCT Filed: Aug. 9, 2018

(86) PCT No.: PCT/JP2018/029967
§ 371 (c)(1),
(2) Date: Feb. 8, 2021

(87) PCT Pub. No.: WO2020/031340
PCT Pub. Date: Feb. 13, 2020

(65) Prior Publication Data
US 2021/0163340 A1 Jun. 3, 2021

(51) Int. Cl.
*C03C 3/087* (2006.01)
(52) U.S. Cl.
CPC .................................. *C03C 3/087* (2013.01)
(58) Field of Classification Search
CPC ..... C03C 10/0018; C03C 4/18; C03C 21/002; C03C 2204/00
See application file for complete search history.

(56) References Cited

U.S. PATENT DOCUMENTS

| 2017/0022092 A1* | 1/2017 | DeMartino ........... G06F 1/1637 |
| 2021/0206684 A1 | 7/2021 | Nozaki et al. |

FOREIGN PATENT DOCUMENTS

| JP | 69245 A | 1/1994 |
| JP | 2004149364 A | 5/2004 |
| JP | 2011213576 A | 10/2011 |
| JP | 2011527661 A | 11/2011 |
| JP | 201323420 A | 2/2013 |
| JP | 2014114200 A | 6/2014 |
| JP | 2016521237 A | 7/2016 |
| JP | 20171937 A | 1/2017 |
| JP | 2017190265 A | 10/2017 |
| JP | 2017530933 A | 10/2017 |
| KR | 1020180035836 A | 4/2018 |
| WO | WO2017030736 A1 | 2/2017 |
| WO | WO2018154973 A1 | 8/2018 |

* cited by examiner

*Primary Examiner* — Alicia J Weydemeyer
*Assistant Examiner* — Laura B Figg
(74) *Attorney, Agent, or Firm* — Li & Cai Intellectual Property Office

(57) ABSTRACT

To provide a crystallized glass substrate including a surface with a compressive stress layer, in which, CS is 400 to 1400 MPa and $CT \times (T-2 \times DOL_{zero})/CS \times DOL_{zero}$ is 0.60 or more, where CS (MPa) denotes a compressive stress on an outermost surface of the compressive stress layer, $DOL_{zero}$ (μm) denotes a stress depth of the compressive stress layer at which the compressive stress is 0 MPa, CT (MPa) denotes a central stress determined by curve analysis, and T (μm) denotes a thickness of the substrate.

8 Claims, 2 Drawing Sheets

CRYSTALLIZED GLASS SUBSTRATE

FIELD OF THE DISCLOSURE

The present disclosure relates to a crystallized glass substrate including a surface with a compressive stress layer.

BACKGROUND OF THE DISCLOSURE

A cover glass for protecting a display is used in a portable electronic device such as a smartphone or a tablet PC. A protector for protecting a lens is also used in an in-vehicle optical device. In recent years, there is a demand for a use in a housing or the like serving as an exterior of an electronic device. There is an increasing demand for a hard and near-unbreakable material so that these devices can withstand more rigorous use. In particular, there is an increasing demand for a material with a high impact resistance.

Conventionally, there is known chemical strengthening as a method for strengthening a glass substrate. For example, Patent Document 1 discloses a crystallized glass substrate for an information recording medium. However, when this crystallized glass substrate is chemically strengthened, it is not possible to achieve a sufficient compressive stress value.

PRIOR ART DOCUMENT

Patent Document

[Patent Document 1] Japanese Unexamined Patent Application Publication No. 2014-114200

SUMMARY OF THE DISCLOSURE

The present disclosure has been made in view of the above problem. An object of the present disclosure is to achieve a hard and near-unbreakable crystallized glass substrate.

As a result of intensive studies to solve the above problem, the present inventors discovered that it was possible to obtain a near-unbreakable crystallized glass substrate having a high impact resistance, when a surface of the crystallized glass substrate included a predetermined compressive stress layer and a predetermined central stress was achieved, and led to completion of the present disclosure. Specifically, the present disclosure provides the following configurations.

(Configuration 1)
A crystallized glass substrate including a surface with a compressive stress layer, wherein
when CS (MPa) denotes a compressive stress on an outermost surface of the compressive stress layer, $DOL_{zero}$ (µm) denotes a stress depth of the compressive stress layer at which the compressive stress is 0 MPa, CT (MPa) denotes a central stress determined by curve analysis, and T (µm) denotes a thickness of the substrate,
CS is 400 to 1400 MPa, and
$CT \times (T - 2 \times DOL_{zero})/CS \times DOL_{zero}$ is 0.60 or more.

(Configuration 2)
The crystallized glass substrate according to configuration 1, wherein a sum of the stress depths from both surfaces of the crystallized glass substrate, $2 \times DOL_{zero}$, is 10 to 80% of a thickness T of the crystallized glass substrate.

(Configuration 3)
The crystallized glass substrate according to configuration 1 or 2, comprising: by wt % in terms of oxide,
40.0% to 70.0% of a $SiO_2$ component;
11.0% to 25.0% of an $Al_2O_3$ component;
5.0% to 19.0% of a $Na_2O$ component;
0% to 9.0% of a $K_2O$ component;
1.0% to 18.0% of one or more selected from a MgO component and a ZnO component;
0% to 3.0% of a CaO component; and
0.5% to 12.0% of a $TiO_2$ component.

(Configuration 4)
The crystallized glass substrate according to any one of configurations 1 to 3, wherein a thickness of the crystallized glass substrate is 0.1 to 1.0 mm.

(Configuration 5)
The crystallized glass substrate according to any one of configurations 1 to 4, wherein E/ρ, which is a ratio of Young's modulus E (GPa) to a specific gravity ρ, is 31 or more.

(Configuration 6)
The crystallized glass substrate according to any one of configurations 1 to 5, wherein a sum of the compressive stress CS on the outermost surface and the central stress CT is 600 to 1400 MPa.

(Configuration 7)
The crystallized glass substrate according to any one of configurations 1 to 6, wherein the stress depth $DOL_{zero}$ is 70 to 110 µm,
the compressive stress CS of the outermost surface is 550 to 890 MPa,
the central stress CT is 100 to 250 MPa, and
a sum of the compressive stress CS on the outermost surface and the central stress CT is 800 to 1200 MPa.

(Configuration 8)
The crystallized glass substrate according to any one of configurations 1 to 6, wherein the stress depth $DOL_{zero}$ is 65 to 85 µm,
the compressive stress CS on the outermost surface is 700 to 860 MPa,
the central stress CT is 120 to 240 MPa, and
a thickness of the crystallized glass substrate is 0.15 to 0.7 mm.

According to the present disclosure, it is possible to obtain a hard and near-unbreakable crystallized glass substrate.

It is possible to use the crystallized glass substrate of the present disclosure for a display of an electronic device, a lens cover glass, an outer frame member or a housing, an optical lens material, and various types of other members.

DETAILED DESCRIPTION OF THE EXEMPLARY EMBODIMENTS

Embodiments and examples of a crystallized glass substrate of the present disclosure will be described below in detail, but the present disclosure is not limited to the following embodiments and examples, and may be implemented with appropriate changes within the scope of the object of the present disclosure.

[Crystallized Glass Substrate]

A crystallized glass substrate of the present disclosure uses crystallized glass as a base material (also referred to as "crystallized glass base material") and includes a surface with a compressive stress layer. It is possible to form the compressive stress layer by subjecting the crystallized glass base material to an ion exchange treatment. The compressive stress layer is formed from an outermost surface of the substrate toward the inside with a predetermined thickness, and a compressive stress is highest on the outermost surface, and decreases toward the inside to zero.

The compressive stress (also referred to as "outermost surface compressive stress") CS of the outermost surface of the compressive stress layer is 400 to 1400 MPa, and may be 550 to 1300 MPa, 600 to 1200 MPa, 650 to 1000 MPa, 700 to 890 MPa, 700 to 880 MPa, or 750 to 860 MPa, for example.

A depth $DOL_{zero}$ (also referred to as "stress depth") of the compressive stress layer, at which the compressive stress is 0 MPa, may be 45 to 200 µm, and may be 50 to 140 µm, 55 to 120 µm, 65 to 110 µm, 70 to 100 µm, or 75 to 85 µm, for example.

A sum of the stress depths from both surfaces of the crystallized glass substrate may be 10 to 80% of a thickness of the compressive stress layer, and may be 12 to 60%, 15 to 50%, or 20 to 40%.

A central stress CT may be 55 to 300 MPa, and may be 60 to 250 MPa, 65 to 240 MPa, 80 to 230 MPa, 100 to 200 MPa, 105 to 180 MPa, or 120 to 150 MPa, for example. It is noted that in the present disclosure, the central stress CT is determined by using curve analysis.

A sum of the outermost surface compressive stress CS and the central stress CT may be 600 to 1400 MPa, 700 to 1200 MPa, 750 to 1100 MPa, or 800 to 1000 MPa.

In the crystallized glass substrate of the present disclosure, $CT \times (T - 2 \times DOL_{zero})/CS \times DOL_{zero}$ is 0.60 or more, where CS (MPa) denotes a compressive stress on an outermost surface, $DOL_{zero}$ (m) denotes a stress depth, CT (MPa) denotes a central stress, and T (m) denotes a thickness of the substrate. For example, $CT \times (T - 2 \times DOL_{zero})/CS \times DOL_{zero}$ may be 0.75 to 1.40, 0.90 to 1.35, 0.93 to 1.30, 0.95 to 1.20, 1.00 to 1.15, 1.04 to 1.12, or 1.06 to 1.10.

$CT \times (T - 2 \times DOL_{zero})/CS \times DOL_{zero}$ will be described below.

Figure 1:
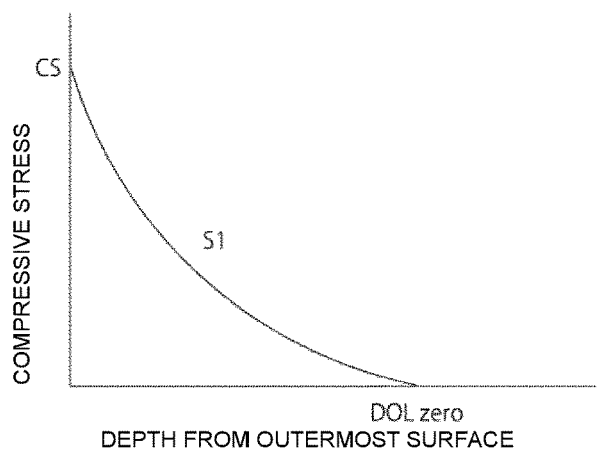
FIG. 1 is a graph showing an example of a change in compressive stress with respect to a depth from an outermost surface of a crystallized glass substrate obtained by a one-step single bath chemical strengthening.

FIG. 1 is a graph showing an example of a change in compressive stress (MPa) with respect to a depth (µm) from the outermost surface in a top surface portion (compressive stress layer) of a crystallized glass substrate subjected to a one-step chemical strengthening using a molten potassium salt. A depth of zero means the outermost surface.

Figure 2:
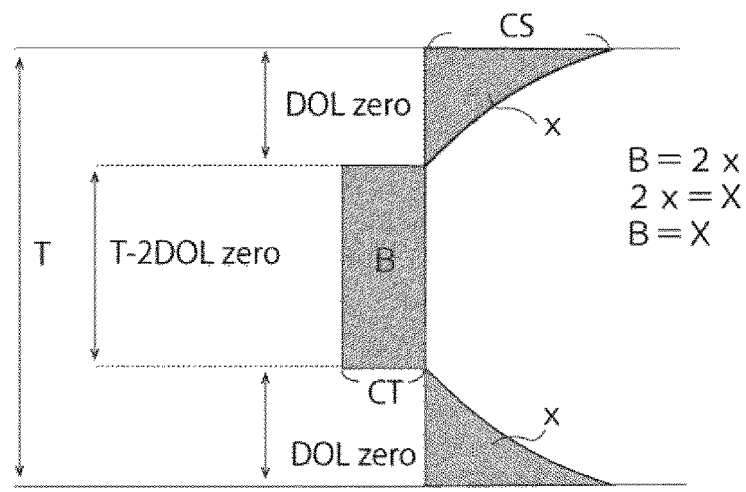
FIG. 2 is a graph showing an example of a change in stress in a thickness direction of a crystallized glass substrate obtained by a one-step single bath chemical strengthening.

FIG. 2 is a graph showing an example of a change in stress in a thickness direction of the same crystallized glass substrate. Specifically, there are compressive stress layers on both sides of the substrate, and a central stress CT is generated in the central portion. The central stress CT is generated according to the stress of the compressive stress layer. Therefore, the area 2x (2x=X), which is the sum of two areas x surrounded by the compressive stress and $DOL_{zero}$, is equal to the area B surrounded by a central thickness excluding $DOL_{zero}$ ($T - 2DOL_{zero}$) and the central stress CT (MPa). That is, the area X and the area B illustrated in FIG. 2 have the same value.

Figure 3:
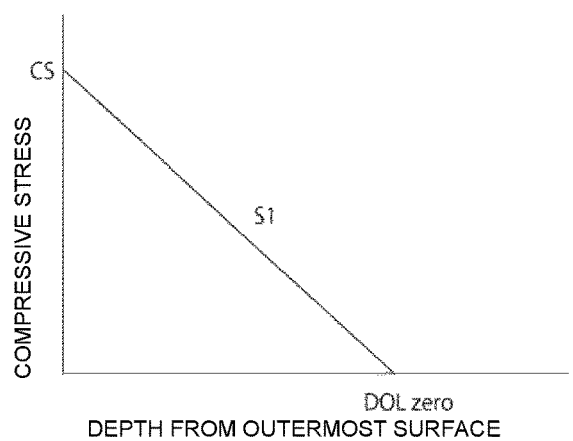
FIG. 3 is a graph showing another example of a change in compressive stress with respect to a depth from an outermost surface of a crystallized glass substrate obtained by a one-step single bath chemical strengthening.
Figure 4:
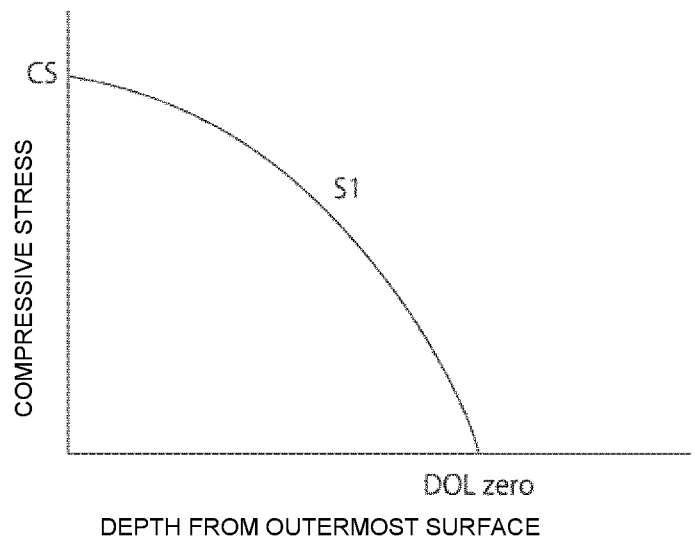
FIG. 4 is a graph showing another example of a change in compressive stress with respect to a depth from an outermost surface of a crystallized glass substrate obtained by a one-step single bath chemical strengthening.

The compressive stress of the compressive stress layer may change as shown in FIGS. 3 and 4 in addition to FIG. 1. In FIG. 3, the compressive stress linearly decreases from CS to 0 with a constant slope. When the area X in this case is defined as the area A, the area A is the sum of the areas of two triangles, which can be calculated by $(CS \times DOL_{zero})/2 \times 2 = (CS \times DOL_{zero})$.

The area X in FIG. 1 is slightly smaller than the area A, and the area X in FIG. 4 is slightly larger than the area A.

Figure 5:
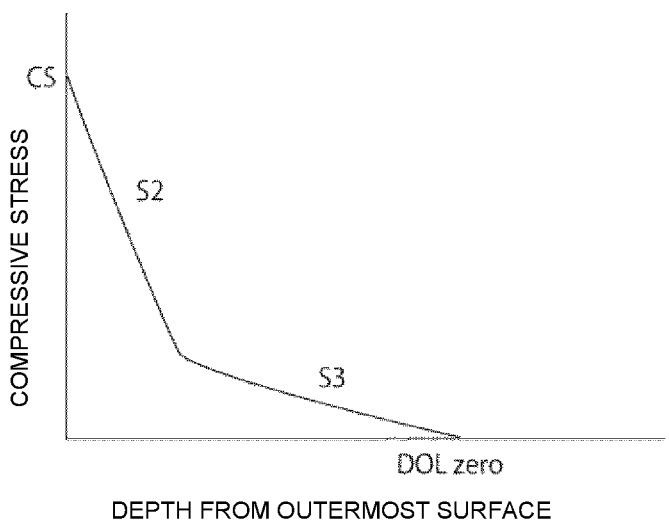
FIG. 5 is a graph showing an example of a change in compressive stress with respect to a depth from an outermost surface of a crystallized glass substrate obtained by a two-step chemical strengthening.

FIG. 5 is a graph showing an example of a change in compressive stress with respect to a depth from the outermost surface of a crystallized glass substrate subjected to a two-step chemical strengthening in which the crystallized glass substrate is first immersed in a mixed molten salt of potassium salt and sodium salt and then immersed in a molten potassium salt. In FIGS. 1, 3 and 4, the compressive stress decreases inward from the outermost surface at a substantially same ratio (substantially constant slope S1). On the other hand, in FIG. 5, the compressive stress suddenly decreases inward from the outermost surface (at a large slope S2), and then gradually decreases (at a small slope S3).

As shown in FIGS. 1, 3 and 4, when the compressive stress decreases gradually, the area X surrounded by the compressive stress and $DOL_{zero}$ is close or equal to the area A, and as shown in FIG. 5, when the compressive stress suddenly decreases inward from the outermost surface, the area X surrounded by the compressive stress and $DOL_{zero}$ is much smaller than the area A. It is not possible to directly calculate the area X, and thus, as shown in FIG. 2, the area X was determined by $CT \times (T - 2 \times DOL_{zero})$ by utilizing the characteristic that the area X and the area B have the same value.

In the present disclosure, the compressive stress gradually decreases inward from the outermost surface, and thus, the area X/area A, that is, $CT \times (T - 2 \times DOL_{zero})/CS \times DOL_{zero}$, is 0.60 or more.

In FIG. 5, the compressive stress suddenly decreases inward from the outermost surface, and thus, the area X/area A, that is, $CT \times (T - 2 \times DOL_{zero})/CS \times DOL_{zero}$, is small, hence less than 0.60.

When the compressive stress layer has the above-mentioned stress depth $DOL_{zero}$, the outermost surface compressive stress CS, and the central stress CT, the substrate is unlikely to break. It is possible to adjust the stress depth, the outermost surface compressive stress, and the central stress by adjusting a composition, a substrate thickness, and a chemical strengthening condition.

A lower limit of a thickness of the crystallized glass substrate is preferably 0.15 mm or more, more preferably 0.30 mm or more, still more preferably 0.40 mm or more, yet still more preferably 0.50 mm or more, and an upper limit of the thickness of the crystallized glass substrate is preferably 1.00 mm or less, more preferably 0.90 mm or less, still more preferably 0.70 mm or less, and yet still more preferably 0.6 mm or less.

$E/\rho$, that is, a ratio of Young's modulus E (GPa) relative to a specific gravity $\rho$ of the crystallized glass substrate, is preferably 31 or more, more preferably 32 or more, and still more preferably 33 or more.

The crystallized glass is a material having a crystalline phase and a glass phase, and is distinguished from an amorphous solid. Generally, the crystal phase of the crystallized glass is determined by using a peak angle appearing in an X-ray diffraction pattern of X-ray diffraction analysis, and by using TEMEDX if necessary.

As the crystal phase, the crystallized glass contains, for example, $MgAl_2O_4$, $MgTi_2O_4$, $MgTi_2O_5$, $Mg_2TiO_4$, $Mg_2SiO_4$, $MgAl_2Si_2O_8$, $Mg_2Al_4Si_5O_{18}$, $Mg_2TiO_5$, $MgSiO_3$, $NaAlSiO_4$, $FeAl_2O_4$, and one or more selected from solid solutions thereof.

An average crystal diameter of the crystallized glass is, for example, 4 to 15 nm, and may be 5 to 13 nm or 6 to 10 nm. If the average crystal diameter is small, a surface roughness Ra after polishing may be smoothly processed up to about several Å levels. In addition, a transmittance increases.

A composition range of each component configuring the crystallized glass is described below. As used herein, a content of each component is expressed in wt % in terms of oxide unless otherwise specified. Here, "in terms of oxide" means, if it is assumed that all the components included in the crystallized glass are dissolved and converted into oxides and a total weight of the oxides is 100% by weight, an amount of oxides in each of the components contained in the crystallized glass is expressed in wt %.

The crystallized glass serving as the base material preferably contains, in wt % in terms of oxide,
- 40.0% to 70.0% of a $SiO_2$ component;
- 11.0% to 25.0% of an $Al_2O_3$ component;
- 5.0% to 19.0% of a $Na_2O$ component;
- 0% to 9.0% of a $K_2O$ component;
- 1.0% to 18.0% of one or more selected from a MgO component and a ZnO component;
- 0% to 3.0% of a CaO component; and
- 0.5% to 12.0% of a $TiO_2$ component.

The $SiO_2$ component is more preferably contained in an amount of 45.0% to 65.0%, and still more preferably 50.0% to 60.0%.

The $Al_2O_3$ component is more preferably contained in an amount of 13.0% to 23.0%.

The $Na_2O$ component is more preferably contained in an amount of 8.0% to 16.0%. The $Na_2O$ component may be contained in an amount of 9.0% or more or 10.5% or more.

The $K_2O$ component is more preferably contained in an amount of 0.1% to 7.0%, and still more preferably 1.0% to 5.0%.

The one or more selected from the MgO component and the ZnO component is more preferably contained in an amount of 2.0% to 15.0%, still more preferably 3.0% to 13.0%, and particularly preferably 5.0% to 11.0%. The one or more selected from the MgO component and the ZnO component may be the MgO component alone, the ZnO component alone, or both of the components, but preferably the MgO component alone.

The CaO component is more preferably contained in an amount of 0.01% to 3.0%, and still more preferably 0.1% to 2.0%.

The $TiO_2$ component is more preferably contained in an amount of 1.0% to 10.0%, and still more preferably 2.0% to 8.0%.

The crystallized glass may contain 0.01% to 3.0% (preferably 0.1% to 2.0%, more preferably 0.1% to 1.0%) of one or more selected from the $Sb_2O_3$ component, the $SnO_2$ component, and the $CeO_2$ component.

The above blending amounts may be combined as appropriate.

The crystallized glass may contain one or more selected from the $SiO_2$ component, the $Al_2O_3$ component, the $Na_2O$ component, the MgO component, and the ZnO component; and the $TiO_2$ component in an amount of 90% or more, preferably 95% or more, more preferably 98% or more, and still more preferably 98.5% or more.

The crystallized glass may contain one or more selected from the $SiO_2$ component, the $Al_2O_3$ component, the $Na_2O$ component, the $K_2O$ component, the MgO component, and the ZnO component; the CaO component; the $TiO_2$ component; and one or more selected from the $Sb_2O_3$ component, the $SnO_2$ component, the $CeO_2$ component in an amount of 90% or more, preferably 95% or more, more preferably 98% or more, and still more preferably 99% or more. The crystallized glass may consist only of these components.

The crystallized glass may or may not contain a $ZrO_2$ component as long as the effect of the present disclosure is not impaired. The blending amount may be 0 to 5.0%, 0 to 3.0%, or 0 to 2.0%.

As long as the effect of the present disclosure is not impaired, the crystallized glass may or may not contain a $B_2O_3$ component, a $P_2O_5$ component, a BaO component, a FeO component, a $SnO_2$ component, a $Li_2O$ component, a SrO component, a $La_2O_3$ component, a $Y_2O_3$ component, a $Nb_2O_5$ component, a $Ta_2O_5$ component, a $WO_3$ component, a $TeO_2$ component, and a $Bi_2O_3$ component. The blending amount of each of the components may be 0 to 2.0%, 0 or more and less than 2.0%, or 0 to 1.0%.

The crystallized glass of the present disclosure may or may not contain, as a clarifying agent, a $Sb_2O_3$ component, a $SnO_2$ component, a $CeO_2$ component, and an $As_2O_3$ component, and in addition, one or two or more kinds selected from the group consisting of F, Cl, NOx, and SOx. However, a content of the clarifying agent is preferably 5.0% or less, more preferably 2.0% or less, and most preferably 1.0% or less.

The crystallized glass serving as the base material preferably contains, in mol % in terms of oxide,
- 43.0 mol % to 73.0 mol % of a $SiO_2$ component;
- 4.0 mol % to 18.0 mol % of an $Al_2O_3$ component;
- 5.0 mol % to 19.0 mol % of a $Na_2O$ component;
- 0 mol % to 9.0 mol % of a $K_2O$ component;
- 2.0 mol % to 22.0 mol % of one or more selected from a MgO component and a ZnO component,
- 0 mol % to 3.0 mol % of a CaO component; and
- 0.5 mol % to 11.0 mol % of a $TiO_2$ component.

The crystallized glass may contain one or more selected from the $SiO_2$ component, the $Al_2O_3$ component, the $Na_2O$ component, the MgO component, and the ZnO component; and the $TiO_2$ component in an amount of 90 mol % or more, preferably 95 mol % or more, more preferably 98 mol % or more, and still more preferably 99 mol % or more.

Other components not described above may be added to the crystallized glass of the present disclosure, if necessary, as long as the characteristics of the crystallized glass of the present disclosure are not impaired. For example, the crystallized glass (and the substrate) of the present disclosure may be colorless and transparent, but the glass may be colored as long as the characteristics of the crystallized glass are not impaired.

There is a tendency that use of each component of Pb, Th, Tl, Os, Be and Se, which is considered, in recent years, as a harmful chemical substance, is prevented, and therefore, it is preferable that the component is not substantially contained.

In a drop test conducted in Examples, the crystallized glass substrate of the present disclosure preferably has a breakage height of 60 cm or more, 70 cm or more, 80 cm or more, 90 cm or more, 100 cm or more, or 110 cm or more.

[Producing Method]

It is possible to produce the crystallized glass substrate of the present disclosure by the following method. That is, a raw material is uniformly mixed and the mixed raw material is melting and forming to produce raw glass. Next, the resultant raw glass is crystallized to produce a crystallized glass base material. Further, the crystallized glass base material is chemically strengthened.

The raw glass is heat-treated to precipitate crystals into the glass. The raw glass may be heat-treated at a one-step temperature or a two-step temperature.

In a two-step heat treatment, a nucleation step is firstly performed by heat treatment at a first temperature, and after the nucleation step, a crystal growth step is carried out by heat treatment at a second temperature higher than that in the nucleation step.

In a one-step heat treatment, the nucleation step and the crystal growth step are continuously performed at the one-step temperature. Typically, the temperature is raised to a predetermined heat treatment temperature, the temperature is maintained for a certain period of time after reaching the heat treatment temperature, and the temperature is then lowered.

A first temperature of the two-step heat treatment is preferably 600° C. to 750° C. A holding time at the first temperature is preferably 30 minutes to 2000 minutes, and more preferably 180 minutes to 1440 minutes.

A second temperature of the two-step heat treatment is preferably 650° C. to 850° C. A holding time at the second temperature is preferably 30 minutes to 600 minutes, and more preferably 60 minutes to 300 minutes.

When the heat treatment is performed at the one-step temperature, the heat treatment temperature is preferably 600° C. to 800° C., and more preferably 630° C. to 770° C. A holding time at the heat treatment temperature is preferably 30 minutes to 500 minutes, and more preferably 60 minutes to 300 minutes.

From the crystallized glass base material, it is possible to produce a thin plate-shaped crystallized glass base material by using, for example, grinding and polishing means.

After that, a compressive stress layer is formed on the crystallized glass base material through ion exchange by a chemical strengthening method.

It is possible to obtain the crystallized glass substrate of the present disclosure by chemically strengthening the crystallized glass base material at a predetermined temperature and for a predetermined time in a molten potassium salt (single bath) (including one or more kinds of potassium salts, such as potassium nitrate ($KNO_3$), potassium carbonate ($K_2CO_3$), and potassium sulfate ($K_2SO_4$)) rather than a mixed molten salt (mixed bath) including potassium salt and sodium salt. For example, the crystallized glass base material is contacted or immersed in a molten salt heated to 450 to 580° C. (500 to 550° C. or 520 to 530° C.), for 380 minutes to 630 minutes, 400 minutes to 600 minutes, 450 to 550 minutes, or 480 to 520 minutes, for example. By such chemical strengthening, an ion exchange reaction between a component present near the surface and a component contained in the molten salt proceeds, and as a result, the compressive stress layer having the above characteristics is formed on the surface. In particular, when the crystallized glass base material is strengthened at 500 to 550° C. for 480 to 520 minutes, it is more likely to obtain a near-unbreakable substrate.

EXAMPLES

Examples 1 to 11 and Comparative Example 1

In Examples 1 to 11, raw materials such as oxides, hydroxides, carbonates, nitrates, fluorides, chlorides, and metaphosphate compounds each of which corresponds to a raw material of each component of the crystallized glass were selected, and these raw materials were weighed and mixed uniformly to have the following composition ratios.

(Wt % in Terms of Oxide)

A $SiO_2$ component is 54%, an $Al_2O_3$ component is 18%, a $Na_2O$ component is 12%, a $K_2O$ component is 2%, a MgO component is 8%, a CaO component is 1%, and a $TiO_2$ component is 5%, and an $Sb_2O_3$ component is 0.1%

Next, the mixed raw materials were fed and melted into a platinum crucible. Thereafter, the molten glass was stirred and homogenized, cast into a mold, and slowly cooled to produce raw glass.

The obtained raw glass was subjected to a one-step heat treatment (at 650 to 730° C., for five hours) for nucleation and crystallization to produce crystallized glass serving as a base material. As a result of analyzing the obtained crystallized glass with a 200 kV field emission transmission electron microscope FE-TEM (JEM 2100F manufactured by JEOL Ltd.), precipitated crystals having an average crystal diameter of 6 to 9 nm were observed. Further, a lattice image was confirmed through an electron diffraction image and the obtained crystallized glass was analyzed by EDX, and crystal phases of $MgAl_2O_4$ and $MgTi_2O_4$ were confirmed. Crystal diameters of crystal particles in a range of 180×180 $nm^2$ were determined by using a transmission electron microscope to calculate an average crystal diameter.

The produced crystallized glass base material was cut and ground to have a shape of 150 mm in length, 70 mm in width, and 1.0 mm or more in thickness, and the opposing sides of the produced crystallized glass base material were polished so as to be parallel to each other. The crystallized glass base material was colorless and transparent.

The opposing sides of the produced crystallized glass base material polished so as to be parallel to each other to obtain the thickness shown in Table 1 was chemically strengthened to obtain a crystallized glass substrate including a surface with a compressive stress layer. Specifically, the crystallized glass base material was immersed in a $KNO_3$ molten salt at a salt bath temperature and in an immersion time shown in Table 1.

In Comparative Example 1, a general chemically strengthened glass substrate having the following composition was used. It is considered that this substrate was immersed in a mixed bath including $KNO_3$ and $NaNO_3$ and then immersed in a single bath including $KNO_3$.

(Wt % in Terms of Oxide)

A $SiO_2$ component is 54%, an $Al_2O_3$ component is 13%, a $Na_2O$ component is 5%, a $K_2O$ component is 17%, a MgO component is 5.5%, a CaO component is 0.5%, and a $B_2O_3$ component is 3%, and a $ZrO_2$ component is 2%

A compressive stress value (CS) (MPa) on an outermost surface and a stress depth ($DOL_{zero}$) (μm) of the crystallized glass substrate were measured by using a glass surface stress meter FSM-6000LE manufactured by Orihara Manufacturing Co., LTD. A refractive index of 1.54 and an optical elastic constant of 29.658 [(nm/cm)/MPa] were used to calculate the compressive stress value (CS) (MPa) and the stress depth ($DOL_{zero}$) (μm). A central stress value (CT) (MPa) was determined by using curve analysis. In Table 1, a substrate thickness (mm), (A) CS×$DOL_{zero}$, (B) CT×(T−

$2 \times DOL_{zero}$) (T is the thickness of the substrate (μm)), (B)/(A), a ratio of $DOL_{zero}$ (a sum of $DOL_{zero}$ values from both surfaces of the substrate) to the thickness (T) (μm) of the substrate ($2DOL_{zero}/T \times 100$), and a sum of an outermost surface compressive stress value and the central stress value (CS+CT) (MPa) are also listed.

A steel ball drop test was performed on the crystallized glass substrate by the following method.

Figure 6:
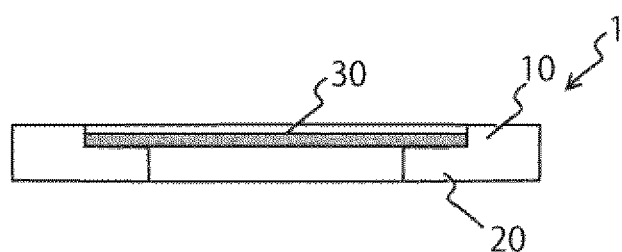
FIG. 6 is a schematic cross-sectional view of a frame used in a drop test in an example.

An acrylic frame 1 was used, and FIG. 6 illustrates a section of the frame 1. The frame 1 includes a rectangular outer frame 10 and an inner frame 20 lower than the outer frame 10, the outer frame 10 and the inner frame 20 forms a step, and the interior of the inner frame 20 is vacant. An inner size of the outer frame 10 is 151 mm×71 mm, and an inner size of the inner frame 20 is 141 mm×61 mm. The crystallized glass substrate 30 was placed inside the outer frame 10 and on the inner frame 20. A 130 g stainless steel ball was dropped from a height of 10 cm from the crystallized glass substrate 30. If the substrate 30 did not break after the drop, the height was increased by 10 cm and the test was continued in much the same way until the substrate 30 was broken. Breakage heights are shown in Table 1. From Table 1, it can be seen that the substrates 30 in Examples are near unbreakable.

Further, Young's modulus E (GPa) and a specific gravity ρ were measured, and a ratio E/ρ therebetween was determined. The Young's modulus was measured by an ultrasonic method. The results are shown in Table 1.

when CS (MPa) denotes a compressive stress on an outermost surface of the compressive stress layer, $DOL_{zero}$ (μm) denotes a stress depth of the compressive stress layer at which the compressive stress is 0 MPa, CT (MPa) denotes a central stress determined by curve analysis, and T (μm) denotes a thickness of the substrate, CS is 400 to 1400 MPa, and
$CT \times (T-2 \times DOL_{zero})/CS \times DOL_{zero}$ is 0.60 or more.

2. The crystallized glass substrate according to claim 1, wherein a sum of the stress depths from both surfaces of the crystallized glass substrate, $2 \times DOL_{zero}$, is 10 to 80% of a thickness T of the crystallized glass substrate.

3. The crystallized glass substrate according to claim 1, comprising: by wt % in terms of oxide,
40.0% to 70.0% of a $SiO_2$ component;
11.0% to 25.0% of an $Al_2O_3$ component;
5.0% to 19.0% of a $Na_2O$ component;
0% to 9.0% of a $K_2O$ component;
1.0% to 18.0% of one or more selected from a MgO component and a ZnO component;
0% to 3.0% of a CaO component; and
0.5% to 12.0% of a $TiO_2$ component.

4. The crystallized glass substrate according to claim 1, wherein a thickness of the crystallized glass substrate is 0.1 to 1.0 mm.

5. The crystallized glass substrate according to claim 1, wherein E/ρ, which is a ratio of Young's modulus E (GPa) to a specific gravity ρ, is 31 or more.

TABLE 1

| | Example | | | | | | | | | | | Comparative |
|---|---|---|---|---|---|---|---|---|---|---|---|---|
| | 1 | 2 | 3 | 4 | 5 | 6 | 7 | 8 | 9 | 10 | 11 | Example 1 |
| Salt bath temperature (° C.) | 520 | 530 | 550 | 520 | 530 | 550 | 460 | 500 | 530 | 540 | 550 | — |
| Immersion time (minutes) | 500 | 500 | 500 | 500 | 500 | 500 | 500 | 500 | 500 | 500 | 500 | |
| Substrate thickness T (mm) | 0.5 | 0.5 | 0.5 | 0.7 | 0.7 | 0.7 | 0.8 | 0.8 | 0.8 | 0.8 | 0.8 | 0.65 |
| CS (MPa) | 813 | 754 | 598 | 852 | 785 | 647 | 1118 | 973 | 797 | 733 | 652 | 742 |
| DOLzero (um) | 74 | 79 | 92 | 81 | 88 | 106 | 47 | 70 | 90 | 98 | 107 | 63 |
| DOLzero ratio (%) | 30 | 31 | 37 | 23 | 25 | 30 | 12 | 18 | 23 | 24 | 27 | 19 |
| CT (MPa) | 181 | 190 | 225 | 125 | 135 | 162 | 63 | 94 | 116 | 123 | 134 | 53 |
| CS + CT (MPa) | 994 | 944 | 822 | 977 | 920 | 810 | 1180 | 1067 | 913 | 856 | 786 | 795 |
| (A) CS × DOLzero | 60138 | 59239 | 54869 | 68755 | 69347 | 68578 | 52957 | 68520 | 72063 | 71551 | 70008 | 46746 |
| (B) CT(T − 2DOLzero) | 63682 | 65032 | 71091 | 67471 | 70762 | 79315 | 44294 | 62031 | 71828 | 74399 | 78315 | 27772 |
| (B)/(A) | 1.06 | 1.10 | 1.30 | 0.98 | 1.02 | 1.16 | 0.84 | 0.91 | 1.00 | 1.04 | 1.12 | 0.59 |
| Drop test height (cm) | 150 | 120 | 100 | 110 | 70 | 90 | 100 | 100 | 90 | 100 | 60 | 50 |
| Young's modulus E (Gpa) | | | | | | 86 | | | | | | 73 |
| Specific gravity ρ | | | | | | 2.54 | | | | | | 2.46 |
| E/ρ | | | | | | 33.9 | | | | | | 29.7 |

Although some embodiments and/or examples of the present disclosure are described above in detail, those skilled in the art may easily apply many modifications to these exemplary embodiments and/or examples without substantial departure from the novel teachings and effects of the present disclosure. Therefore, many of these modifications are within the scope of the invention.

All the contents of the literature described in the specification are incorporated herein.

What is claimed is:

1. A crystallized glass substrate including a surface with a compressive stress layer, wherein 6. The crystallized glass substrate according to claim 1, wherein a sum of the compressive stress CS on the outermost surface and the central stress CT is 600 to 1400 MPa.

7. The crystallized glass substrate according to claim 1, wherein the stress depth $DOL_{zero}$ is 70 to 110 μm,
the compressive stress CS of the outermost surface is 550 to 890 MPa,
the central stress CT is 100 to 250 MPa, and
a sum of the compressive stress CS on the outermost surface and the central stress CT is 800 to 1200 MPa.

8. The crystallized glass substrate according to claim 1, wherein the stress depth $DOL_{zero}$ is 65 to 85 μm, the compressive stress CS on the outermost surface is 700 to 860 MPa,
the central stress CT is 120 to 240 MPa, and
a thickness of the crystallized glass substrate is 0.15 to 0.7 mm.

* * * * *